April 13, 1943.   P. ULLMAN   2,316,301
ILLUMINATED MAGNIFYING LENS AND READING GLASS
Filed Oct. 5, 1940

INVENTOR.
PAUL ULLMAN
BY
ATTORNEY.

Patented Apr. 13, 1943

2,316,301

UNITED STATES PATENT OFFICE 2,316,301

ILLUMINATED MAGNIFYING LENS AND READING GLASS

Paul Ullman, St. Louis, Mo.

Application October 5, 1940, Serial No. 359,863

2 Claims. (Cl. 88—39)

This invention relates generally to magnifying lenses and reading glasses. More particularly, my invention relates to, and has for its primary object the provision of a durable, inexpensive, conveniently usable magnifying lens or glass of such unique structure as to produce and present a diffused light upon the object being viewed and to illuminate the same with multidirectional rays of light, thereby minimizing shadows and facilitating vision.

And with the above and other objects in view, my invention resides in the novel features of form, construction, arrangement, and combination of parts presently described and pointed out in the claims.

In the accompanying drawing—

Figure 1:
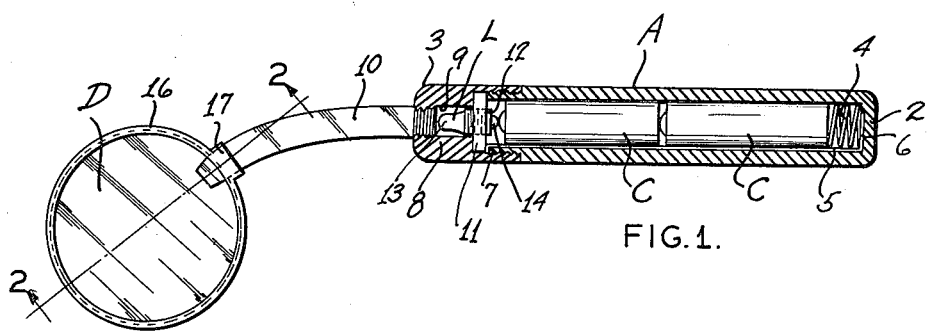
Figure 1 is a plan view, partly in longitudinal section, of an illuminated magnifying or reading glass of my invention.

Referring now in more detail and by reference characters to the drawing, which illustrates practical embodiments of my invention, the magnifying or reading glass comprises a suitably elongated tubular shell A having at one end a preferably integral end wall 2 and at its opposite end being open and externally threaded, as shown, for receiving a closure-cap 3, the shell A being preferably constructed or molded of Bakelite or other dielectric material and shaped, sized, and patterned for conveniently fitting, as a handle or hand-grip, the hand of a user.

Loosely disposed within, and impinging at one end against the end-wall 2 of, shell A, is a compression spring 4, and preferably molded or otherwise fixed in the shell A, is a longitudinally extending conductor-strip 5 bent over at its one or inner end, as at 6, for electrical contact with the spring 4 and curled over and clinched at its other or outer end, as at 7, upon the peripheral margin or lip of the shell mouth.

The cap 3 includes a relatively thick end-wall 8, which is axially bored and threaded, as at 9, for receiving one end of a preferably, though not necessarily, curved or bowed rigid of rod-like section 10 of Lucite or other suitable material having the optical property of receiving rays of light at one end and transmitting such rays of light through its mass for emission at its other end, the Lucite section 10 being preferably bifurcated or forked at its opposite or free end, as at 10', for purposes presently appearing.

At its open threaded end, the cap 3 is counterbored, as shown, to removably seat a metallic washer 11 centrally apertured and threaded for receiving the base 12 of a suitable illuminating lamp L, the bulb 13 of which projects into the cap-bore 9 and the contact-button 14 of which is oppositely presented into the shell A for electrical engagement with preferably one or more standard cells C yieldingly housed therein and, in turn, electrically impinging the spring 4, as will be well understood.

Figure 2:
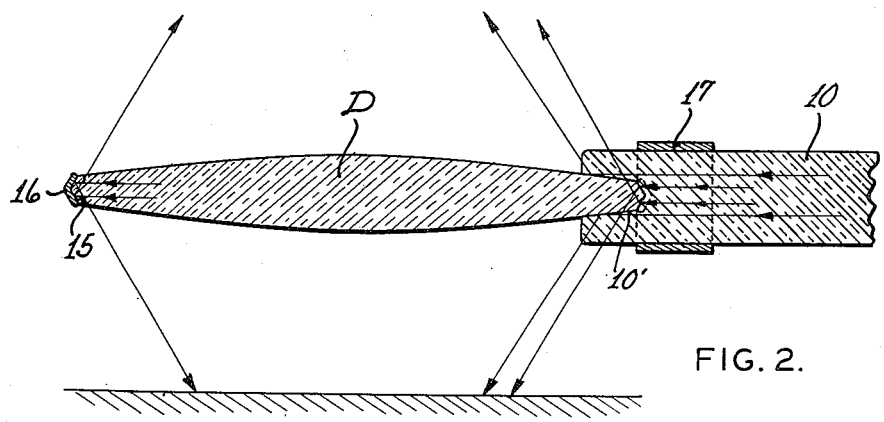
Figure 2 is an enlarged fragmentary sectional view of the lens or glass, taken approximately along the line 2—2, Figure 1.

D designates a preferably circular or disk-shape glass or lens of desired magnifying power, which is acutely beveled upon its periphery, as at 15, and fitted with an encircling or embracing bezel 16, in turn, provided with a preferably integral ferrule-like band or ring 17 for snugly receiving and engaging the rod 10 adjacent its bifurcated end 10', as best seen in Figures 1 and 2, the rod 10, at its said end 10', forkwise embracing a peripheral portion of, and being preferably also suitably connected or otherwise adhesively attached to, the lens D.

In use, suitable dry cells or batteries C are loaded into the shell A and the shell A threaded tightly into the cap 3, the end 7 of the conducting-strip 5 being hence brought into circuit-completing engagement with the washer 11 and energizing lamp L. The rays emitted by the lamp L are then conducted through the Lucite rod 10 to its bifurcated end 10', which functions prismatically to disperse a portion of the transmitted light rays. The remainder of such rays are dispersed through the body of the lens D and are deflected outwardly at the beveled lens periphery 15 in a ring of diffused light, as shown in Figure 2, thereby efficiently totally removing or minimizing shadows and greatly facilitating vision, and the Lucite section 10 functioning both as a support and as a light ray transmitting agent for the lens D.

When not in use, the lamp L may be readily de-energized by slightly unthreading the shell A from the cap 3 to move the end 7 of the contact-strip 5 out of engagement with the washer 11.

Figure 3:
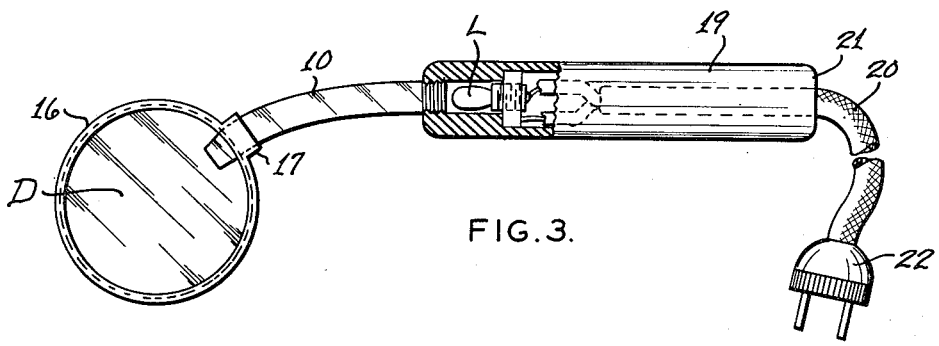
Figure 3 is a plan view, partially broken away and in section, of a slightly modified illuminated reading glass or lens embodying my invention.

If desired, the cap 3 and shell A may be constructed in one piece in the form of a handle 19, as shown in Figure 3, and the lamp L connected conventionally to the ends of an electric cord or other flexible conductor 20 extending through the end wall 21 of the handle 19 for engagement by means of a conventional separable plug 22 with any suitable source of current supply.

The glass may be inexpensively constructed, is exceedingly durable, readily manipulable, and efficient in the performance of its intended functions.

It should be understood that changes and modifications in the form, construction, arrangement, and combination of the several parts of the glass may be made and substituted for those herein shown and described without departing from the nature and principle of my invention.

Having thus described my invention, what I claim and desire to secure by Letters Patent is:

1. A reading glass comprising a tubular handle having an opening at one end, a light-ray-emitting source housed in the handle, a disk-shaped marginally beveled lens, a rim embracing and supporting said lens and having a substantially radially projecting tubular ferrule opening to the edge of the lens and having the opening thereof wider than said marginal edge, and a supporting member of rod-like configuration having the optical property of receiving light rays at one end and transmitting said rays endwise through its mass for emission at its other end, said member having one end mounted at the opening of said handle to receive light rays from the light-ray-emitting source and having its opposite light-emitting end received in said tubular ferrule whereby light rays emitted therefrom strike the marginally bevelled edge of the lens.

2. A reading glass comprising a tubular handle having an opening at one end, a light-ray-emitting source housed in said handle and projecting rays through said opening, a disk-shaped marginally bevelled lens, a bevel embracing marginally around said lens and having a substantially radially projecting tubular ferrule open to and wider than the marginal edge of the lens, and a supporting member of rod-like configuration having the optical property of receiving light rays at one end and transmitting such rays endwise through its mass for emission at its other end, said supporting member being fitted at one end within the light-emitting opening of the tubular handle in light-ray-conducting communication with said light source for receiving light rays therefrom and being bifurcated at its other end and having this bifurcated end fitted through the tubular ferrule with the bifurcated portion fork-wise embracing a marginal portion of the lens whereby light rays transmitted by said supporting member fall upon said lens and the marginally bevelled edge thereof and upon the bezel.

PAUL ULLMAN.